April 14, 1931.  E. G. KESLING  1,800,837
SPEED CHANGING MECHANISM
Filed Sept. 27, 1928  3 Sheets-Sheet 1
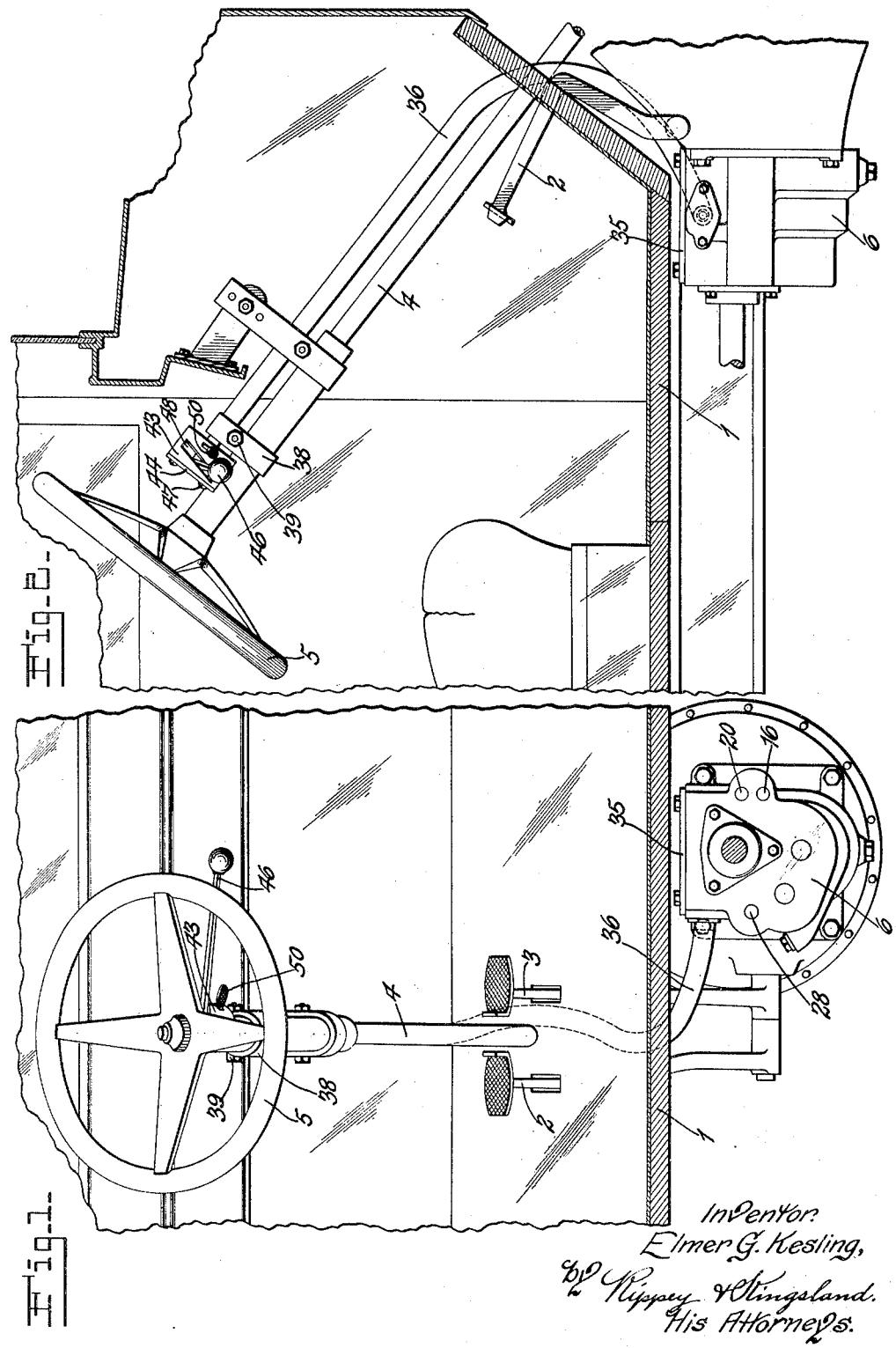
Inventor:
Elmer G. Kesling,
by Rippey & Kingsland.
His Attorneys.

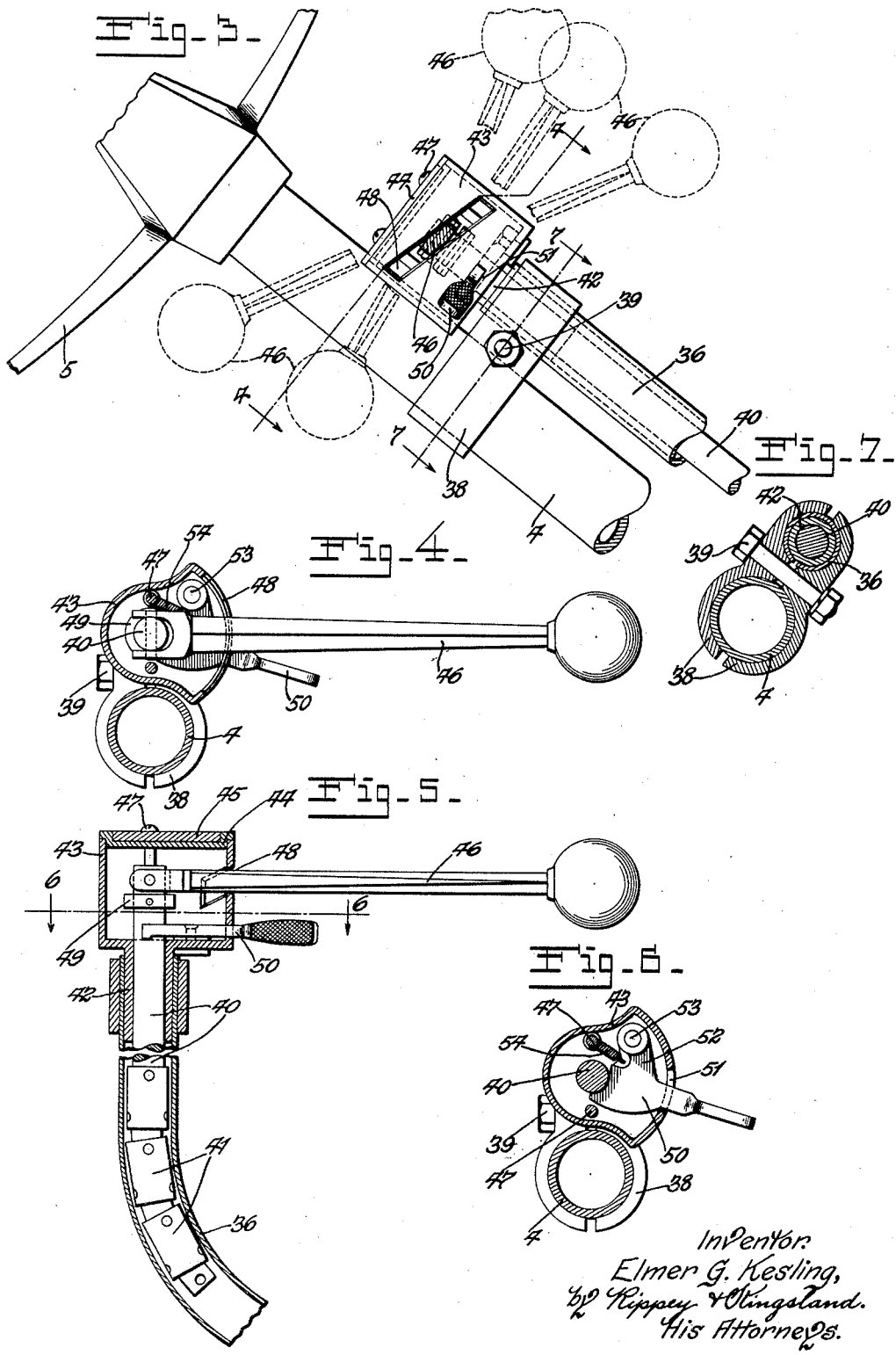

April 14, 1931.  E. G. KESLING  1,800,837
SPEED CHANGING MECHANISM
Filed Sept. 27, 1928  3 Sheets-Sheet 3
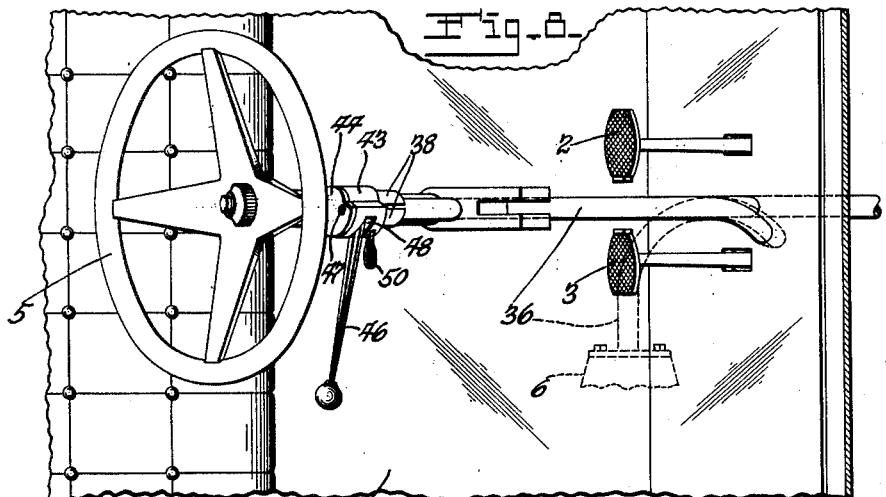
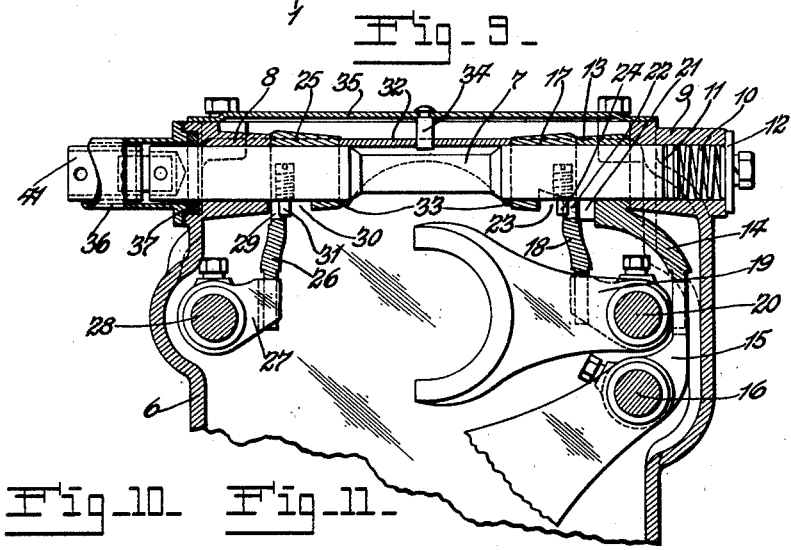
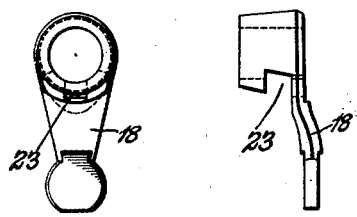
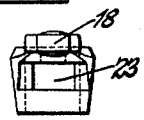
Inventor:
Elmer G. Kesling,
by Rippey & Vlingeland.
His Attorneys.

Patented Apr. 14, 1931

1,800,837

UNITED STATES PATENT OFFICE

ELMER G. KESLING, OF BLOOMFIELD, MISSOURI

SPEED-CHANGING MECHANISM

Application filed September 27, 1928. Serial No. 308,701.

This invention relates to speed changing mechanism for use on motor vehicles and it comprises the novel combination, construction and arrangement of parts herein shown, described and claimed.

An object of the invention is to provide improved means for imparting longitudinal and rocking movements to the gear shifting spindle of a speed changing mechanism as an incident to the longitudinal and rocking movements of a manually operated control shaft which is equipped with means for actuating the control shaft selectively to different longitudinal positions for turning movements in different directions in order to operate selectively the gear shifting yokes or arms which are supported on said spindle.

Another object of the invention is to provide an improved device for controlling the extent of longitudinal movement of the control shaft.

Another object of the invention is to provide an improved actuating lever and a combined support and guide therefor, by operation of which lever the control shaft may be selectively turned and actuated longitudinally.

Other objects will appear from the following description, reference being made to the drawings in which Fig. 1 is a rear elevation of the invention embodied in an automobile.

Fig. 2 is a side elevation of the same.

Fig. 3 is an enlarged side elevation showing the support and guide for the control shaft and the dotted lines showing various positions of the operating lever for said shaft.

Fig. 4 is a cross sectional view through the support and guide for the lever of the control shaft taken approximately on the line 4—4 of Fig. 3.

Fig. 5 is a vertical sectional view of the same.

Fig. 6 is a cross sectional view approximately on the line 6—6 of Fig. 5.

Fig. 7 is a cross sectional view approximately on the line 7—7 of Fig. 3.

Fig. 8 is a top plan view of the invention.

Fig. 9 is a vertical cross sectional view of the transmission case in which the gear shifting spindle is mounted.

Fig. 10 is an inner side elevation of one of the gear shifting arms.

Fig. 11 is a side edge elevation of one of said arms.

Fig. 12 is a lower end elevation of one of said arms.

The invention is illustrated in connection with an automobile, the body of which has a floor 1, through which the clutch and brake pedals 2 and 3 extend, and having the steering column 4 and wheel 5 in the usual positions and having the transmission gears (not shown) located within a transmission case 6. The gear shifting spindle 7 is supported by the transmission case for longitudinal and rocking movements and it is this spindle that selectively shifts the gears, preferably by the type of connections herein shown and described. This spindle has one end mounted in a bearing 8 and the opposite end in a bearing 9. A spring 10 is confined in the outer end of the bearing 9 between the end 11 of the spindle 7 and a plug or abutment 12 removably attached to the case 6. The spring 10 is of such length that it is compressed only during the last selective movement of the spindle 7 in that direction. The function of the spring 10 is to insure a definite position of the first selection in that direction of the spindle 7, by preventing the spindle 7 from falling beyond selective position on account of slack or lash that may exist in the means controlling the longitudinal selective movements.

A hub 13 loosely supported by the spindle 7 has its outer end abutting against the bearing 9 and is provided with an appropriately shaped depending arm 14, which is in constant engagement with one end of a gear shifting yoke 15 attached to a rod 16 mounted for sliding movements in the walls of the case 6 at right angles to the axis of the spindle 7.

The inner end of the hub 13 is against the outer end of a hub 17 loosely supported by the spindle 7 and provided with an appropriately shaped depending arm 18, which is in constant engagement with one end of a gear shifting yoke 19 attached to a rod 20 mounted for sliding movements in the walls of the case 6 parallel with the rod 16 and at right angles to the axis of the spindle 7.

The end of the hub 13 that is toward the hub 17 has a notch 21 in its under side. The adjacent portion of the arm 18 has a slot 22 in alinement with the notch 21 and said slot 22 is in communication with a slot 23 formed in the under side of the hub 17. The slot 23 is of greater circumferential length than the width of the slots 21 and 22. A projection 24 rigid with the spindle 7 is movable from normal or neutral position in which it is partly within the slot 22 (Fig. 9) to position in the slot 23 to permit the spindle 7 to be rocked in either direction without moving either of the arms 14 or 18. When the spindle 7 is moved to an intermediate position in contact with the spring 10 the projection 24 is wholly engaged within the slot 22 and will swing the arm 18 in accordance with rocking movements of the spindle 7. In the extreme outward position of the spindle 7 the projection 24 is disengaged from the hub 17 and the arm 18 is engaged in the notch 21 so that the arm 14 will be operated in accordance with the rocking movements of the spindle 7 while the arm 18 remains stationary.

A hub 25 is loosely supported by the spindle 7 and is provided with an appropriately shaped depending arm 26, which is in constant engagement with a part 27 of a gear shifting yoke that is attached to a rod 28. The rod 28 is mounted for sliding movements in the walls of the case 6 at right angles to the axis of the spindle 7 and parallel with the rods 16 and 20. The unit 25—26 as shown is a duplicate of the unit 17—18, the arm 26 having a slot 29 opening into a slot 30 in the under side of the hub 25. The slots 29 and 30 are arranged and formed the same as the slots 22 and 23, the circumferential length of the slot 30 being greater than the width of the slot 29. A projection 31 rigid with the spindle 7 is arranged to operate in the slots 29 and 30. In normal or neutral position of the spindle 7 the projection 31 is partly within the slot 29. When the spindle 7 is moved in a direction and to a position to place the projection 24 wholly within the slot 23 the projection 31 is thereby placed wholly within the slot 29. When the spindle is moved in the opposite direction to position in which the projection 24 is wholly within the slot 22 the projection 31 is within the slot 30 so that the arm 26 will not be operated when the spindle 7 is rocked in either direction. So, too, when the projection 24 is within the slots 21 of the hub 13 the projection 31 is wholly within the slot 30 permitting rocking movements of the spindle 7 without disturbing the arm 26 just as such rocking movements are permitted without disturbing the arm 18.

A spacer 32 having rings 33 on its ends is mounted between the inner ends of the hubs 17 and 25 and retains said hubs in their proper spaced relationship without interfering with their operations by the spindle 7. The spacer is held from turning about the spindle 7 by a pin 34 projecting from the removable cover plate 35 of the case 6.

An appropriately shaped tube 36 is attached to the side wall of the case 6. A packing ring 37 is compressed between the end of the tube 36 and the outer end of the bearing 8 around the projecting end of the spindle 7. The tube 36 is curved and extended as shown and projects upwardly and rearwardly in front of the steering column 4, being attached to said steering column by a bracket comprising a pair of clamping elements 38 (Fig. 7) shaped to embrace the steering column and the tube 36 and attached together by a bolt 39. A control shaft is mounted in the tube 36 for longitudinal and rocking movements. As shown, the control shaft comprises a straight portion 40 in the straight portion of the tube 36 above the steering column 4, and a jointed portion 41 contained within the curved portion of the tube 36. The lower end of the straight shaft portion 40 is connected with the upper end of the jointed shaft portion 41 (Fig. 5); and the lower end of the jointed shaft portion 41 is connected with the spindle 7 (Fig. 9).

The upper end of the part 40 of the control shaft is journaled for rocking and longitudinal sliding movements in the neck 42 of a box 43. The neck 42 of the box 43 is rigidly secured in the upper end of the tube 36. Thus, in the specific embodiment and relationship shown, the shaft portion 40 is mounted for rocking and for longitudinal sliding movements parallel with and in front of the steering column. Thus, the axis of the shaft portion 40 and the axis of the bearing neck 42 in which said shaft portion 40 is mounted for longitudinal and rocking movements is parallel with the steering column 4. The shaft portion 40 projects upwardly into the box 43. The box is equipped with a lid or cover plate 44 supporting a legend plate 45 which may contain notations indicating proper operations of the operating lever 46 to obtain the desired results and changes in speed. The lid and legend plate are attached to the box 43 by fasteners 47 which pass through the box and engage the lower end wall of the box. The box 43 has a slot 48 formed obliquely to the axis of the shaft 40, said slot extending from its front end to its rear end toward the steering wheel 5 (Fig. 3). The lever 46 projects through said slot 48 and is pivotally engaged with the shaft 40 in such a way that proper manipulation of said lever will impart rocking and longitudinal sliding movements selectively to said shaft 40 and thereby impart selective rocking and longitudinal sliding movements to the spindle 7. That is, by swinging the end of the lever 46 toward the ends of the slot 48, the shaft 40 will be rocked and, by operating said lever upon the upper and lower edges of said slot 48 as fulcrums, longitudinal sliding movements will be imparted to said shaft 40—41 and thereby to the spindle 7. This arrangement of the slot 48 causes the general forward travel of the outer end of the lever 46 to be in a direction away from the rim of the steering wheel 5 instead of toward or parallel with said wheel and, at the same time, to approach horizontal movement so as to move in an easier swing approximately toward and from the operator. The approach toward horizontal movement of the lever 46 will depend upon the inclination of the slot 48 with respect to the axis of the shaft 40. The shown and described arrangement of the slot 48 obtains maximum facility of operation of the device in the arrangement in which the parts are shown.

A collar 49 is attached to the shaft 40 within the box 43. A lever 50 projects through a slot 51 in the wall of the box 43 below the slot 48 and has an arm 52 mounted on a pivot 53 in said box. A spring 54 connects the lever arm 52 with one of the fasteners 47 and normally holds the end of the lever 50 against the shaft 40 between the collar 49 and the lower end wall of the box 43. Thus, the lever 50 is normally held by the spring 54 in position to function as an abutment for the collar 49 to limit extent of longitudinal movement of the shaft 40 in one direction. When it is desired to move the shaft 40 longitudinally to a greater extent the outer end of the lever 50 may be manually engaged and operated in opposition to the spring 54 in a direction and to an extent to remove said lever from position to function as an abutment for the collar 49. Thus, the shaft 40 may be moved longitudinally by the lever 46 to a greater extent than said shaft may be moved when the lever 50 functions as an abutment for the collar 49.

In the normal or neutral position of the device the lever 50 is in position to function as an abutment, so that the shaft 40 and its connections may be moved approximately equal distances in opposite directions. Thus, by moving downwardly the outer end of the lever 46 the spindle 7 (Fig. 9) will be operated in a direction and to an extent to place the projection 31 wholly within the slot 29 and to move the projection 24 wholly into the slot 23. The lever 46 may then be moved optionally toward the forward end or toward the rear end of the slot 48 for different forward speeds of travel. Such forward and rear movements of the lever 46 will, of course, rock the spindle 7 and cause the projection 31 correspondingly to operate the arm 26 and thereby the rod 28. Or, the outer end of the lever 46 may be raised until the collar 49 abuts against the lever 50. Thus, by moving upwardly the end of the lever 46, the spindle 7 will be operated in a direction and to an extent to place the projection 24 wholly within the slot 22 and to move the projection 31 wholly into the slot 30, and to contact the end 11 of the spindle 7 with the end of the spring 10. The lever 46 may then be moved optionally toward the forward end or toward the rear end of the slot 48 for reverse or forward travel. Such forward and rear movements of the lever 46 will, of course, rock the spindle 7 and cause the projection 24 correspondingly to operate the arm 18 and thereby the rod 20. Or, by moving the lever 50 out of the way of the collar 49, the end of the lever 46 may be raised to an extent to move the spindle 7 longitudinally a sufficient distance, and in opposition to the spring 10, to place the projection 24 wholly within the slot 21 when the projection 31 is wholly within the slot 30. This permits rocking movements of the spindle 7 without disturbing the arms 18 and 26. When the projection 24 is placed wholly within the slot 21, as described, the lever 46 may be moved toward the front end or toward the rear end of the slot 48 to rock the spindle 7 in the direction desired and correspondingly operate the arm 14 for another speed of forward travel.

It is apparent that if the spindle 7 be turned in either direction when the projection 31 is within the slot 29, the projection 24 will be against the inner side of the arm 18 so that it is impossible for the spindle 7 or its connections to work out of their proper adjustments. So, too, when the spindle 7 is rocked while the projection 24 is wholly within the slot 22 the projection 31, by abutting against the side of the arm 26, will prevent undesired movements of the parts. And, when the spindle 7 is rocked while the projection 24 is wholly within the slot 21, said projection 24, by abutting against the side of the arm 18, will prevent the parts from becoming displaced from their desired relative adjustments.

I am aware that the construction, arrangement and relationship of the parts comprising this invention may be otherwise arranged and assembled and that the device may be otherwise varied without departure from the nature and principle of the invention. I do not restrict myself unessentially in any of the disclosed respects, but what I claim and desire to secure by Letters Patent is:—

1. In speed changing mechanism, a spindle supported for rocking and longitudinal movements, a shaft for rocking and moving said spindle longitudinally, a lever connected with said shaft for rocking and moving said shaft longitudinally, a stationary support, an abutment mounted on said support, means in connection with said shaft in a relationship to cooperate with said abutment to limit extent of longitudinal movement of said shaft in one direction, and means for moving said abutment to position to permit a greater extent of movement of said shaft in said direction.

2. In speed changing mechanism, a control shaft supported for rocking and longitudinal movements, an element for imparting rocking and longitudinal movements to said shaft, a stationary support, an abutment mounted on said support, means in connection with said shaft in a relationship to cooperate with said abutment to limit extent of longitudinal movements of said shaft in one direction, a device for holding said abutment in position to limit extent of longitudinal movement of said shaft as aforesaid, and means for moving said abutment to position to permit a greater extent of movement of said shaft in said direction.

3. In speed changing mechanism, a shaft, means for supporting said shaft for rocking and longitudinal movements, a lever pivoted to said shaft for imparting rocking and longitudinal movements to said shaft, and a guide for said lever arranged in a plane inclined relative to the axis of said shaft and constituting a fulcrum for said lever.

4. In speed changing mechanism, a shaft, means for supporting said shaft for rocking and longitudinal movements, a lever pivoted to said shaft for imparting rocking and longitudinal movements to said shaft, a guide for said lever arranged in a plane inclined relative to the axis of said shaft and constituting a fulcrum for said lever, and a movable abutment limiting extent of movement of said shaft in one direction.

5. In speed changing mechanism, a shaft, means for supporting said shaft for rocking and longitudinal movements, a lever pivoted to said shaft for imparting rocking and longitudinal movements to said shaft, a guide for said lever arranged in a plane inclined relative to the axis of said shaft and constituting a fulcrum for said lever, a movable abutment limiting extent of movement of said shaft in one direction, means for holding said abutment in position to limit extent of movement of said shaft in said direction as aforesaid, and means for moving said abutment to position to permit a greater extent of movement of said shaft in said direction.

6. In speed changing mechanism, a shaft supported for rocking and longitudinal movements, a box into which said shaft extends and having in one wall a slot in a plane inclined relative to the axis of said shaft, a lever extending through said slot and connected with said shaft in said box for imparting rocking and longitudinal movements to said shaft and fulcruming against the walls of said slot, and a spring opposing final longitudinal movement of said shaft in one direction.

7. In speed changing mechanism, a transmission case, a spindle mounted for rocking and longitudinal movements in said case, manually operative connections for imparting rocking movements to said spindle and for moving said spindle longitudinally in either direction from a starting position, a number of arms supported by said spindle in said case, means for operating said arms selectively by rocking movements of said spindle, and a spring for opposing final longitudinal movement of said spindle in one direction.

8. In speed changing mechanism, a transmission gear case, a spindle supported for rocking and longitudinal movements in said case, a hub supported by said spindle and having a slot in one side thereof, an arm projecting from said hub and having a slot of less width than and opening into the slot in the hub, a projection on said spindle, and a device for moving said spindle longitudinally to engage said projection in either of said slots and for rocking said spindle, said slots being in a relationship in which rocking movements of said spindle will permit said hub and said arm to remain stationary when said projection is in said slot in said hub and will rock said hub and thereby said arm when said projection is in said slot in said arm.

9. In speed changing mechanism, a transmission gear case, a spindle supported for rocking and longitudinal movements in said case, a hub supported by said spindle and having a slot in one side thereof, an arm projecting from said hub and having a slot of less width than and opening into the slot in the hub, a projection on said spindle, a device for moving said spindle longitudinally to engage said projection in either of said slots and for rocking said spindle, said slots being in a relationship in which rocking movements of said spindle will permit said hub and said arm to remain stationary when said projection is in said slot in said hub and will rock said hub and thereby said arm when said projection is in said slot in said arm, and means for actuating said device and thereby said spindle to a position in which said projection engages in said slot in said arm.

10. In speed changing mechanism, a gear case, a spindle supported for rocking and longitudinal movements in said case, a pair of hubs supported by said spindle in endwise adjacent relationship and one of said hubs having a slot in its end and the other hub having a slot of equal width and opening into said slot in said first named hub and also having a slot of greater circumferential width than either of said first named slots, an arm projecting from each of said hubs, a projection from said spindle, and means for moving said spindle longitudinally in one direction to place said projection in either of said two first named slots and for rocking said spindle after such longitudinal movements, or for moving said spindle longitudinally in the opposite direction to place said projection in said third slot, as desired.

11. In speed changing mechanism, a transmission gear case, a spindle supported for rocking and longitudinal movements in said case, a pair of hubs supported by said spindle and each having a slot in one side thereof, an arm projecting from each of said hubs and having a slot of less width than and opening into the slot in the corresponding hub, a pair of projections on said spindle normally engaged in parts of said slots in said arms, and means for moving said spindle longitudinally in either direction to engage said projections selectively in said slots in said arms, the other projection being engaged in the slot in the corresponding hub when said spindle is moved to engage either of said projections in the slot in the corresponding arm as aforesaid.

12. In speed changing mechanism, a transmission gear case, a spindle supported for rocking and longitudinal movements in said case, a pair of hubs supported by said spindle and each having a slot in one side thereof, an arm projecting from each of said hubs and having a slot of less width than and opening into the slot in the corresponding hub, a pair of projections on said spindle, means for moving said spindle longitudinally in either direction to engage said projections selectively in said slots in said arms, the other projections being engaged in the slot in the corresponding hub when said spindle is moved to engage either of said projections in the slot in the corresponding arm as aforesaid, and means for preventing longitudinal movements of said hubs with said spindle.

13. In speed changing mechanism, a shaft mounted for rocking and longitudinal movements, elements supported for selective operation by said shaft, means cooperating with said elements respectively to hold said shaft against longitudinal movements during rocking movements of said shaft, an actuating lever for imparting a rocking and longitudinal movement to said shaft, and an arcuate fulcrum for said lever having its fulcruming edge inclined from end to end relative to the plane of the axis of said shaft.

14. In a speed changing mechanism, a shaft mounted for rocking and longitudinal movements, elements supported for selective operation by said shaft, means cooperating with said elements respectively to hold said shaft against longitudinal movements during rocking movements of said shaft, an actuating lever for imparting rocking and longitudinal movements to said shaft, and elongated fulcrums inclined from end to end relative to the plane of the axis of said shaft for guiding said lever during movement of said lever to rock said shaft and for fulcruming said lever during longitudinal movements of said shaft.

15. In mechanism of the character described, a spindle supported for rocking and longitudinal movements, a hub supported by said spindle and having a slot in one side thereof, an arm projecting from said hub and having a slot of less width than and opening into the slot in the hub, a projection on said spindle, and a device for moving said spindle longitudinally to engage said projection in either of said slots and for rocking said spindle, said slots being in a relationship in which rocking movements of said spindle will permit said hub and said arm to remain stationary when said projection is in said slot in said hub and to rock said hub and thereby said arm when said projection is in said slot in said arm.

16. In mechanism of the character described, a spindle supported for rocking and longitudinal movements, a hub supported by said spindle and having a slot in one side thereof, an arm projecting from said hub and having a slot of less width than and opening into the slot in the hub, a projection on said spindle, a device for moving said spindle longitudinally to engage said projection in either of said slots and for rocking said spindle, said slots being in a relationship in which rocking movements of said spindle will permit said hub and said arm to remain stationary when said projection is in said slot in said hub and to rock said hub and thereby said arm when said projection is in said slot in said arm, a rod supported for longitudinal sliding movements, and means for moving said rod longitudinally by said arm when said arm is rocked by said projection as aforesaid.

17. In speed changing mechanism, a shaft mounted for rocking and longitudinal movements, elements supported for selective operation by said shaft, means cooperating with said elements, respectively, to hold said shaft against longitudinal movements while said shaft is rocking, an actuating lever mounted at an angle with respect to the axis of said shaft and having one end connected with said shaft for rocking and moving said shaft longitudinally, and a combined guide and fulcrum for said lever supported at an angle with respect to the plane of the axis of said shaft, whereby the angle of said lever with respect to the axis of said shaft is changed during movement of said lever in said guide.

ELMER G. KESLING.